Figure 1:
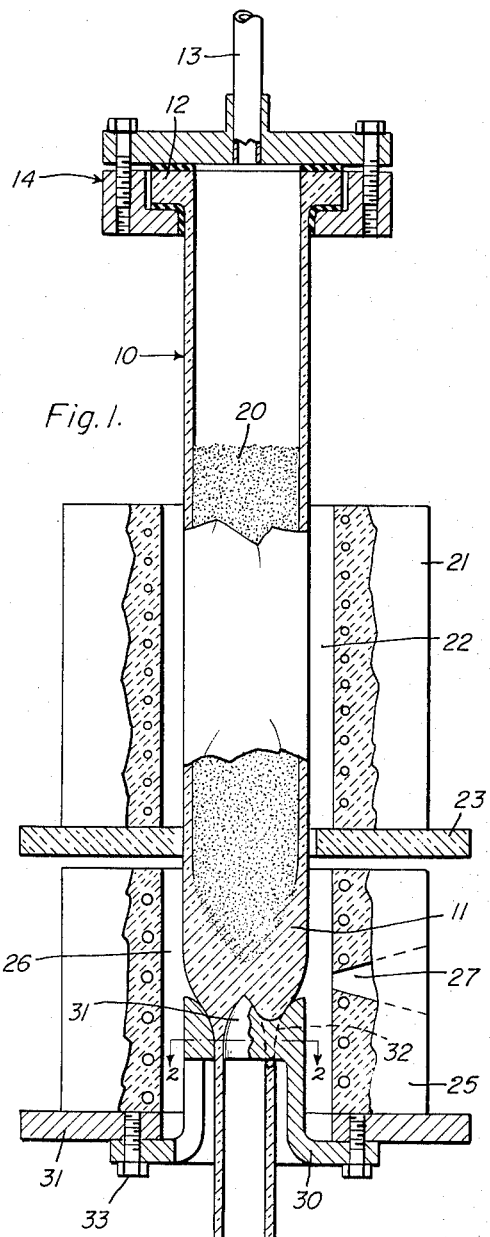

Inventor:
Charles R. Morelock,
by Richard G. Speer
His Attorney.

United States Patent Office 3,261,676
Patented July 19, 1966

3,261,676
METHOD FOR FORMING SILICA ARTICLES
Charles R. Morelock, Ballston Spa, N.Y., assignor to General Electric Company, a corporation of New York
Filed Jan. 24, 1963, Ser. No. 253,675
1 Claim. (Cl. 65—18)

This invention relates to the production of fused silica tubes and rods and more particularly to an improved method for producing such articles.

Fused silica, commonly called clear fused quartz, articles are normally produced by methods involving the melting of a quantity of quartz sand into ingot form and the subsequent remelting of the ingot for shaping into the desired form. Such manufacturing methods are exceedingly wasteful, for example requiring almost 100 pounds of raw material to produce 50 pounds of finished product, and additionally result in losses occurring from deterioration of the apparatus used to melt and shape the fused silica. Part of the loss occurring through use of existing processes is in the ingot forming operation and is caused by spalling of the ingot, excessive bubble formation, or mold cracking before fusion. The furnaces do not permit observation of the melting process and, therefore, the runs must be made blind. The other part of the loss is in the draw operations and is due to sub-standard tubing and ingot end losses.

It is further important to distinguish between quartz and the vitreous, amorphous, non-crystalline form of silica which is referred to in this specification as "fused silica." Although both substances are chemically $SiO_2$, there are marked differences in their physical characteristics. Whereas fused silica is amorphous and non-crystalline, quartz, which is usually alpha phase quartz, is crystalline and has a much higher coefficient of expansion than fused silica. A simplified list follows showing silicon dioxide phases through which alpha quartz passes upon being heated:

| Temperature: | Phase |
|---|---|
| Room temperature to 573° C. | Alpha quartz (crystalline). |
| 573° C.–870° C. | Beta quartz (crystalline). |
| 870° C.–1470° C. | Tridymite (crystalline). |
| 1470° C.–1625° C. | Beta cristobalite (crystalline). |
| Above 1710° C. | Fused silica (noncrystalline silica). |

Graphite molds are used to form the ingots in the melting process and are destroyed in each run by the silica-graphite reaction at the melting temperature and by cracking during cooling.

It is a principal object of this invention to provide a process for producing fused silica tubes and rods which eliminates the need for molds.

Another object of this invention is to provide a process for the production of fused silica rods or tubes in a direct manner and more economically than has heretofore been possible.

Figure 2:
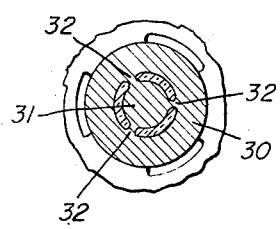

Other objects and advantages of this invention will be in part obvious and in part explained by reference to the accompanying specification and drawing. In the drawing:

FIG. 1 is a partially sectioned side elevation of an apparatus constructed to carry out the process of this invention; and FIG. 2 is a cross-sectional view taken along the line 2—2 of FIG. 1.

Broadly, the present process for producing fused silica rod or tube is one in which a quantity of granular silica, for example quartz sand, is placed in a fused quartz tube which has one end sealed. The fused quartz tube is suspended vertically with the sealed end down while the open, upper end of the tube is connected to a vacuum system. The tube and its silica contents are progressively lowered through two heating zones, the first heating zone bringing the tube and granular or particulate silica to a temperature sufficient to effect degasification thereof and the second heating zone raising them to their fusion temperature. The resulting fused mass is drawn through a suitable forming or shaping device for shaping into the desired rod or tube configuration.

The process can best be understood by reference to FIG. 1 of the drawing. In this figure, numeral 10 indicates a fused silica tube which is shown as vertically disposed with its lower end 11 sealed and its upper end 12 connected to a source of vacuum via the connecting tube 13. The tube 10 is of larger diameter than will be the diameter of the finished rod or tube so that a comparatively short length of starting tube 10 can result in long lengths of completed product. End 12 of tube 10 is connected to tube 13 by means of a clamping and sealing arrangement 14. It will be appreciated that the sealing arrangement 14 is only one of several arrangements that may be used and that the present invention is in no way dependent upon the exact sealing structure shown.

Contained within the closed fused silica tube 10 is a quantity of granular silica 20, this material having been placed within the tube prior to engaging the sealing device 14. Granular silica may be naturally occurring quartz sand or may be rock quartz which has been granulated, the particular type used being a matter of choice.

After the tube has been mounted in the vertical position shown in FIG. 1 with its open end connected to evacuating apparatus (not shown), it is lowered into a first heating means, here shown as furnace 21, which defines a first heating zone 22. With the tube evacuated to a pressure no greater than about $5 \times 10^{-2}$ mm. Hg, the furnace 21 elevates progressive portions of tube 10 and its contents 20 to a temperature of from about 900° C.–1600° C., a temperature on the order of 1100° C. being adequate in most instances. The purpose of this initial heating is to effect degasification of the tube 10 and its contents 20 so that subsequently fused, gas bubbles will not be trapped in the fused mass and thereby render it unusable. The evacuating step is effected continuously throughout process of raw material into final product.

Situated immediately beneath the furnace 21 and separated therefrom by a heat radiation shield 23 is a second furnace 25. Furnace 25 operates at a higher temperature than furnace 21 and creates a second heating zone 26 which is at a temperature of not less than about 1800° C. A temperature of at least 1800° C. is required since this is the minimum temperature at which fusion of the silica 20 and the tube 10 can be advantageously effected. Furnace 25 includes a sight port 27 which extends through its wall and enables viewing of the closed, fused end 11 of tube 10. It is at this lower end that fusion of silica 20 and tube 10 is effected and a molten mass of fused silica results. The sight port 27 is important to facile accomplishment of the process, since it permits the operator to visually ascertain just when the end 11 of tube 10 has become sufficiently viscous for the subsequent shaping operation. Without this particular provision, the process would be more difficult to carry out because the precise time when drawing operations should commence would be a matter for conjecture.

The apparatus of FIG. 1 includes means for shaping the fused mass of silica obtained in heating zone 26. This means includes a die member 30 which is attached to flange 31 at the base of furnace 35. As shown in FIG. 2, the die member 30 includes a central mandrel 31 which is connected to it by means of webs 32. With the die mandrel assembly attached to flange 31, as by means of bolts 33, the fused silica mass formed by the melting of the silica 20 with the fused silica tube 10 can be drawn through the die and mandrel assembly 30, 31 into tubing. As the fused silica is continuously drawn into tubing, new material is supplied by lowering the silica 20 and tube 10 into the melting, or second heating zone 26. The length of the tube produced is determined principally by the length of the initial fused silica tube 10. The operation is terminated when the pressure of the silica 20 combined with the viscous force of the fused silica cannot be maintained at the level required to prevent air from being drawn upwardly through the newly formed tube into the interior of tube 10 by virtue of the reduced pressure present therein.

The preceding description has dealt almost exclusively with the production of fused silica tubing but it is to be understood that the present invention is not limited merely to the production of this specific configuration. It will be appreciated that clear, fused silica rod can be produced as well as tubing and that the present invention also contemplates such production. For instance, removal of the mandrel 31 from die 30, or the substitution of a die which contains no mandrel, would result in the production of long lengths of fused silica rod rather than tube.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claim.

What I claim as new and desire to secure by Letters Patent of the United States is:

The process for producing a fused silica tube or rod comprising: providing a fused silica tube of preselected diameter and length having one end sealed, positioning the silica tube in a vertical position with the closed end down, placing a quantity of granular crystalline silica in the fused silica tube, connecting the open upper end of the fused silica tube to an evacuating system having a pressure no higher than $5 \times 10^{-2}$ mm. Hg and effecting continuous evacuation thereof, heating the fused silica tube and its granular crystalline silica contents in a first heating zone to a temperature of from about 900° C. to 1600° C. to effect degasification thereof, progressively lowering the silica tube and its contents through the first heating zone into a second heating zone and heating to a temperature of not lower than about 1800° C., to effect fusion of the silica tube and the granular crystalline silica into an integral homogeneous mass, and shaping the fused mass into a desired shape as it exits from the second heating zone.

References Cited by the Examiner

UNITED STATES PATENTS

| | | | |
|---|---|---|---|
| 1,169,681 | 1/1916 | Sand | 65—36 |
| 1,537,036 | 5/1925 | Miller | 65—18 X |
| 2,433,116 | 12/1947 | Greenbowe et al. | |
| 2,752,731 | 7/1956 | Altosaar | 65—23 |
| 2,980,957 | 4/1961 | Hicks | 65—2 |
| 3,037,241 | 6/1962 | Bazinet et al. | 65—3 |
| 3,116,137 | 12/1963 | Vasilos et al. | 65—18 X |

FOREIGN PATENTS

| | | |
|---|---|---|
| 15,629 | 1913 | Great Britain. |
| 520,564 | 3/1955 | Italy. |

DONALL H. SYLVESTER, *Primary Examiner.*

F. W. MIGA, *Assistant Examiner.*